United States Patent
Takahashi

(10) Patent No.: US 7,961,735 B2
(45) Date of Patent: Jun. 14, 2011

(54) COMMUNICATION APPARATUS AND CONTROL METHOD OF THE SAME

(75) Inventor: Naoto Takahashi, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 1203 days.

(21) Appl. No.: 11/616,620

(22) Filed: Dec. 27, 2006

(65) Prior Publication Data

US 2007/0160055 A1    Jul. 12, 2007

(30) Foreign Application Priority Data

Jan. 12, 2006  (JP) ................... 2006-005392

(51) Int. Cl.
*H04L 12/56* (2006.01)
(52) U.S. Cl. .............. 370/395.2; 455/420; 455/502
(58) Field of Classification Search .......... 455/420, 455/502
See application file for complete search history.

(56) References Cited

U.S. PATENT DOCUMENTS

| | | | |
|---|---|---|---|
| 6,728,231 B1* | 4/2004 | Sugaya et al. | 370/336 |
| 7,023,818 B1* | 4/2006 | Elliott | 370/328 |
| 7,200,397 B1* | 4/2007 | Jones et al. | 455/436 |
| 2002/0044549 A1* | 4/2002 | Johansson et al. | 370/386 |
| 2003/0076842 A1* | 4/2003 | Johansson et al. | 370/401 |
| 2003/0169697 A1 | 9/2003 | Suzuki et al. | |
| 2003/0235161 A1* | 12/2003 | Shoji et al. | 370/329 |
| 2006/0258338 A1* | 11/2006 | Markki et al. | 455/414.1 |

FOREIGN PATENT DOCUMENTS

JP    2003-143644    5/2003

* cited by examiner

*Primary Examiner* — Nghi H Ly
*Assistant Examiner* — Joseph Dean, Jr.
(74) *Attorney, Agent, or Firm* — Canon USA, Inc. IP Division

(57) ABSTRACT

A communication apparatus functioning as a mobile station may include a message receiver, a communication range determination unit, an existence determination unit, and a management signal output unit. The message receiver receives from a first control station a message that indicates a second control station. The communication range determination unit determines whether the apparatus is in a region within the second control station communication range. If the apparatus is in a region within the second control station communication range, then the existence determination unit determines whether there is another mobile station that belongs to a communication group of the first control station and exists in a region outside the second control station communication range. If the other mobile station is determined to exists, then the management signal output unit outputs a management signal as a third control station for constructing a communication group including the other mobile station.

9 Claims, 15 Drawing Sheets

FIG. 12A

| COMMUNICATION PARTNER ID | TIME | COUNT | DATA AMOUNT | TIME ZONE |
|---|---|---|---|---|
| 102 | 20 | 5 | 100 | 1 |
| 103 | 0 | 0 | 0 | 2 |
| 104 | 15 | 4 | 150 | 3 |
| 105 | 10 | 3 | 80 | 4 |
| 106 | 1 | 1 | 5 | 5 |

| COMMUNICATION PARTNER ID | TIME | COUNT | DATA AMOUNT | TIME ZONE |
|---|---|---|---|---|
| 102 | 14 | 1 | 100 | 1 |
| 103 | 15 | 4 | 150 | 2 |
| 104 | 0 | 0 | 0 | 3 |
| 105 | 3 | 1 | 100 | 4 |
| 106 | 0 | 0 | 0 | 5 |
| 1302a | 1302b | 1302c | 1302d | 1302e |

| RESIDUAL PAPER QUANTITY | RESIDUAL INK QUANTITY | RESIDUAL BATTERY QUANTITY | |
|---|---|---|---|
| PRESENT | PRESENT | 60 | |

| RESIDUAL BATTERY QUANTITY | DATA TO BE TRANSMITTED | |
|---|---|---|
| 30 | PRESENT | |

1402

COMMUNICATION APPARATUS AND CONTROL METHOD OF THE SAME

BACKGROUND OF THE INVENTION

1. Field of the Invention

The present invention relates to the formation of a communication group comprising a control station and mobile station. The present invention more particularly relates to the formation of a communication group when a control station of the communication group is replaced with a new one and there is a mobile station incapable of communicating with the new control station.

2. Description of the Related Art

In some wireless communication networks, one wireless cell comprises a control station and mobile station. For example, a communication network currently being standardized by IEEE802.15, such as IEEE802.15.3a (a so-called UWB (Ultra Wide Band)), comprises a control station and mobile station (patent reference 1). A network (i.e., a communication group) controlled by one control station is called a piconet. Also, a range within which a sync signal from a control station controlling the piconet can reach is called a communication range. The inside of the communication range is called a region within the communication range of the control station. The outside of the communication range is called a region outside the communication range of the control station. The sync signal is sometimes called a management signal for network management. In a network like this, a control station (also called a parent station, master, or primary station) broadcasts to a mobile station (also called a slave or secondary station) a signal for establishing synchronization or a signal for notifying the mobile station that it belongs to the network under the control of the control station. The signal transmitted from a control station to a mobile station in order to construct a wireless network will be referred to as a sync signal in the present invention. Also, a network terminal complying with the IEEE802.15.3a standards is normally a multi-functional terminal having a mobile station function and control station function. Therefore, a mobile station can also function as a control station. However, a mobile station having no control station function can also exist.

A terminal having received a sync signal from a control station operates as a mobile station, i.e., performs predetermined processing corresponding to a communication scheme and transmits a response to the control station. This establishes synchronization between the mobile station and control station, so they can communicate with each other by exchanging necessary information such as addresses. This procedure is performed between the control station and each mobile station having received by a sync signal. Consequently, the control station having transmitted one sync signal (or a series of sync signals) and the mobile stations having responded to the sync signal form a piconet. That is, the mobile stations are members forming the piconet. The control station maintains the piconet by periodically transmitting the sync signal.

The control station of the piconet thus constructed sometimes transfers the control to a new control station. According to the IEEE802.15 MAC standards, if there is a mobile station having capability as a control station higher than that of a present control station, the present control station transfers the control to this mobile station. In this case, the new control station (called an alternative control station) may exist in a position different from the original control station, and this may produce a mobile station which exists in a region outside the communication range of the new control station. If this mobile station in the region outside the communication range is a multi-functional terminal having a control station function, it can operate as another control station and form a new piconet. [Patent reference 1] U.S. patent application Publication No. 2003169697 (Japanese Patent Laid-Open No. 2003-143644)

Unfortunately, a certain terminal functioning as a mobile station cannot operate as a control station (a mobile station like this will be referred to as a restricted mobile station hereinafter). Whether a terminal can operate as a control station is determined by, e.g., the capacity of a built-in memory and whether the terminal is driven by a battery. For example, a terminal which is driven by a battery or has a small memory capacity and hence is unable to function as a control station is designed and fabricated to exclusively function as a mobile station. A restricted mobile station like this cannot communicate with other terminals unless there is a control station including this mobile station in a region within the communication range of the control station. Accordingly, a restricted mobile station in a region outside the communication range of the alternative control station loses the means for communicating with other terminals.

Also, even when a terminal in a region outside the communication range of the alternative control station is a multi-functional terminal, a new piconet constructed by this terminal functioning as a control station does not necessarily include terminals which belong to the original piconet. If the new piconet does not include the terminals which belong to the original piconet, it may become meaningless to construct the new piconet.

SUMMARY OF THE INVENTION

The present invention has been made in consideration of the above prior art, and has as its object to provide a wireless communication apparatus and a control method of the same capable of achieving communication between terminals which belong to a certain wireless cell even when a control station controlling the wireless cell is replaced with another.

The present invention has been made in consideration of the above prior arts, and comprises the following arrangement. That is, a communication apparatus functioning as a mobile station, comprises:

a message receiver which receives, from a first control station, a message indicating a second control station which is a new control station;

a communication range determination unit which determines whether the communication apparatus is in a region within a communication range of the second control station;

an existence determination unit which, if the communication range determination unit determines that the communication apparatus is in a region within the communication range of the second control station, determines whether there is another mobile station which belongs to a communication group of the first control station and exists in a region outside the communication range of the second control station; and a management signal output unit which, if the existence determination unit determines that the other mobile station exists, outputs, as a third control station, a management signal for constructing a communication group including the other mobile station.

The above arrangement has the effect of achieving communication between mobile stations which belong to a wireless cell even when a control station controlling the wireless cell is replaced with another.

Further features of the present invention will become apparent from the following description of exemplary embodiments with reference to the attached drawings.

BRIEF DESCRIPTION OF THE DRAWINGS

FIGS. 12A and 12B are views showing examples of communication recording tables; and FIGS. 13A and 13B are views showing examples of status tables.

DESCRIPTION OF THE EMBODIMENTS

First Embodiment

<Arrangements of Terminal and Network>

Figure 1:
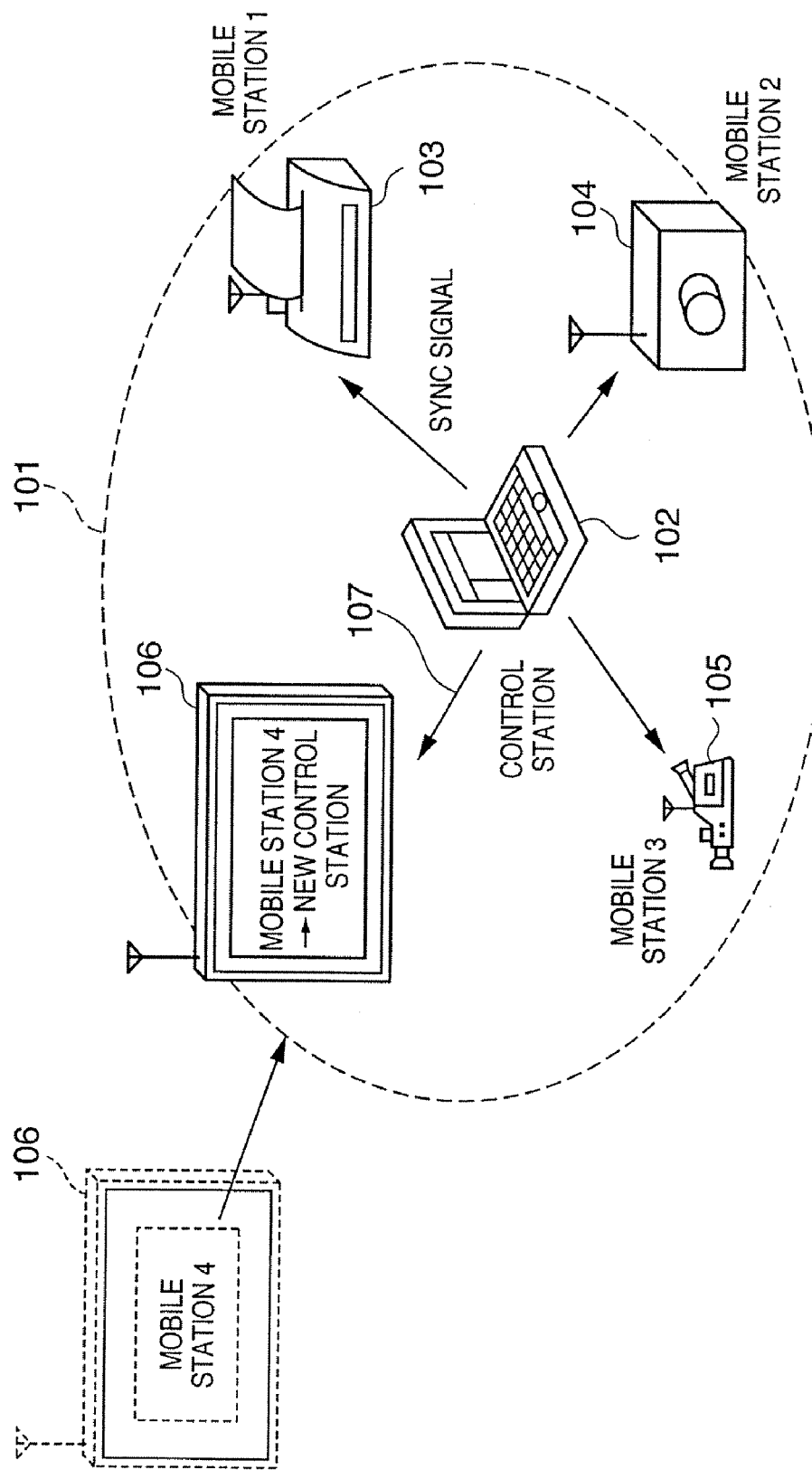
FIG. 1 is a view showing the arrangement of the first embodiment of the present invention.
Figure 2:
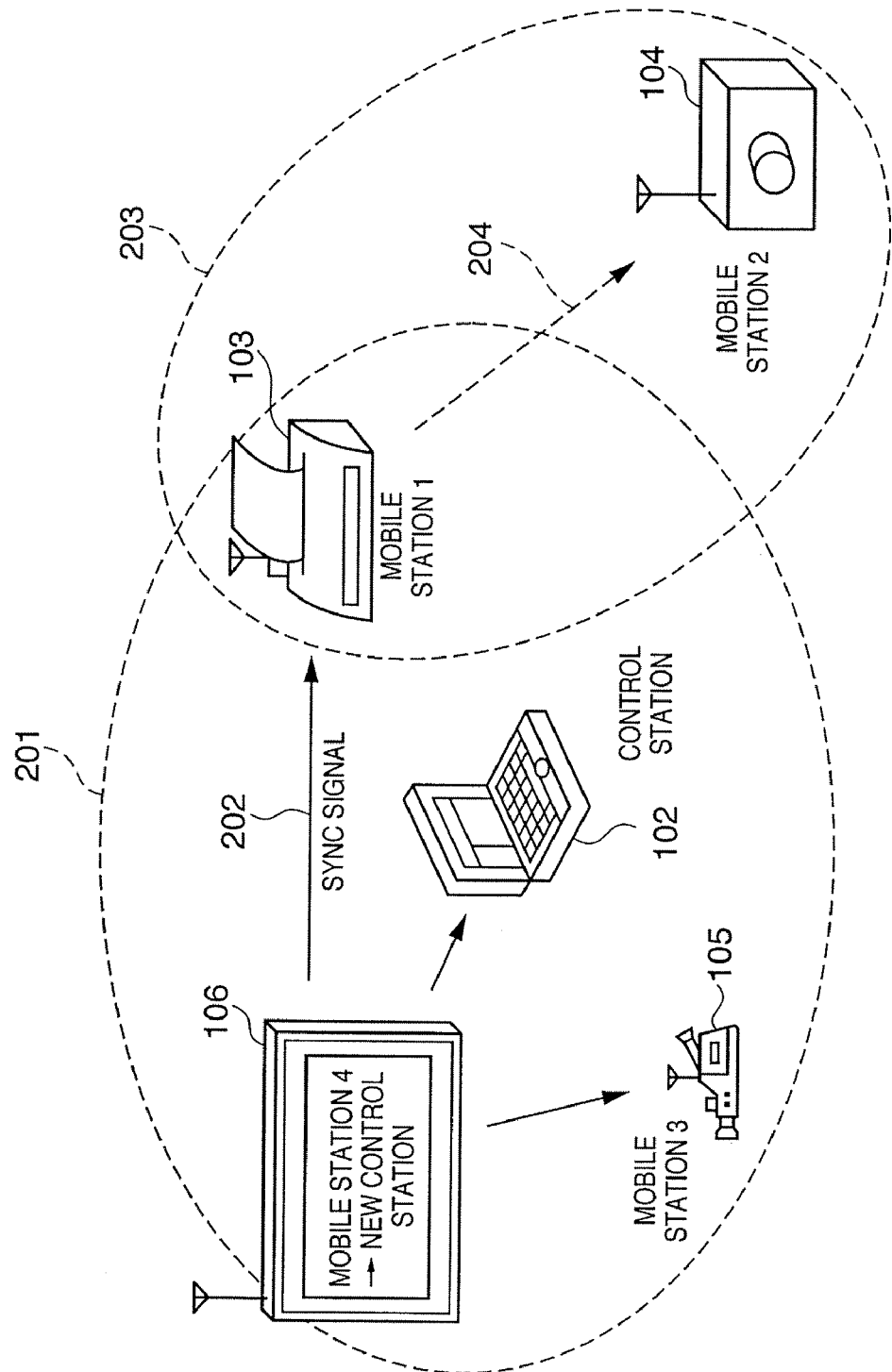
FIG. 2 is a view showing the arrangement of the first embodiment of the present invention after the control of a control station is transferred.
Figure 3:
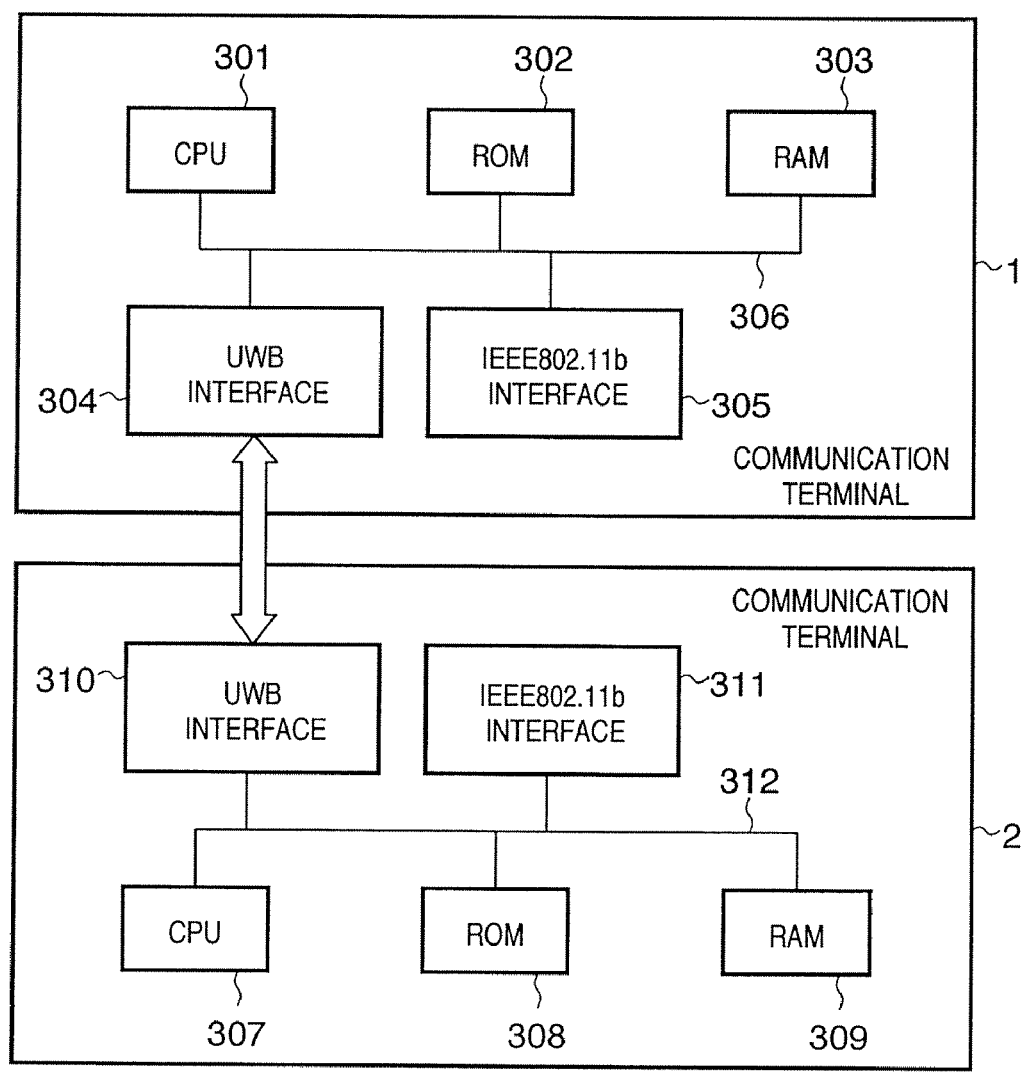
FIG. 3 is a block diagram of a communication system.
Figure 6:
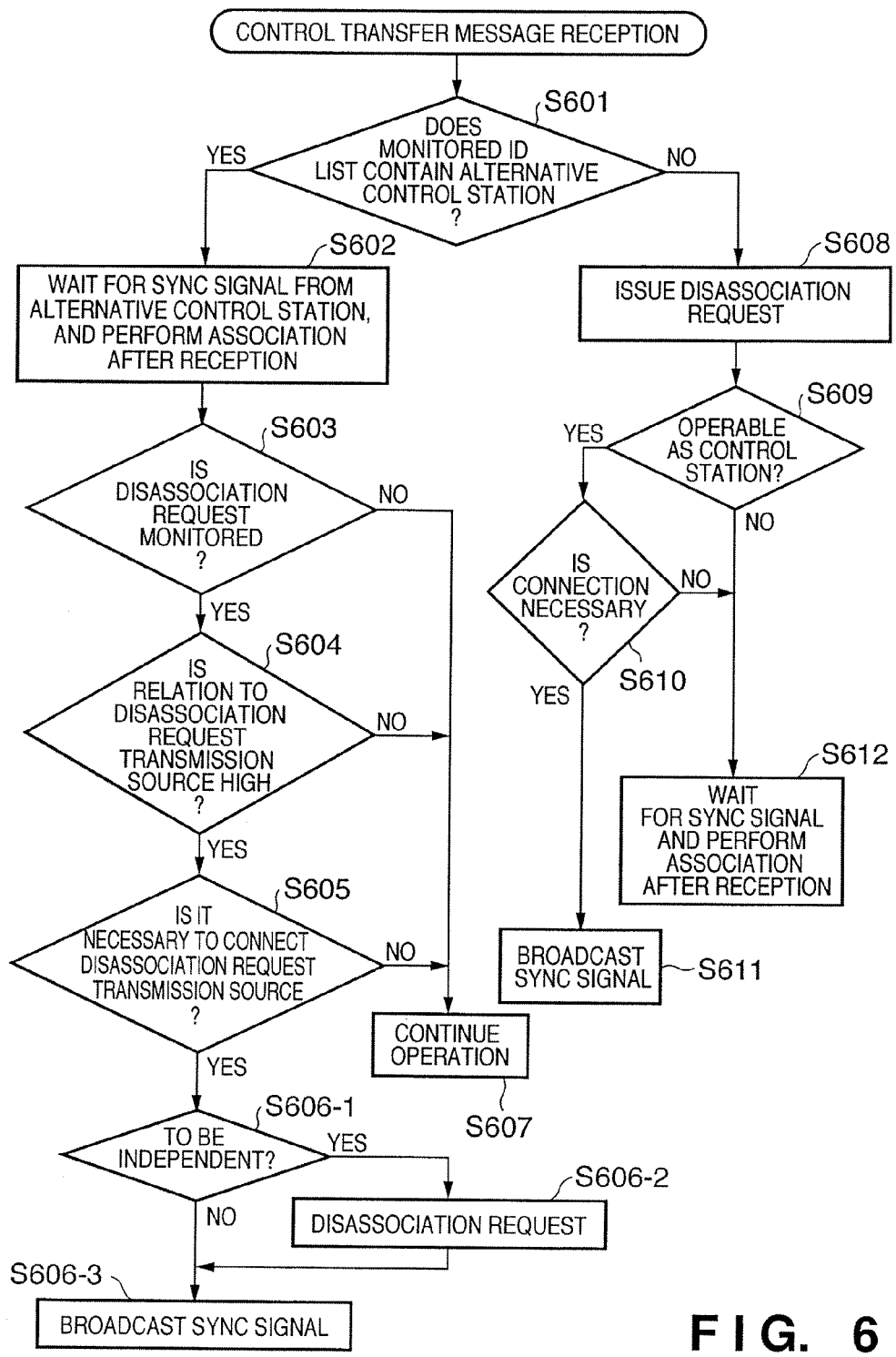
FIG. 6 is a flowchart of the first embodiment of the present invention.
Figure 7:
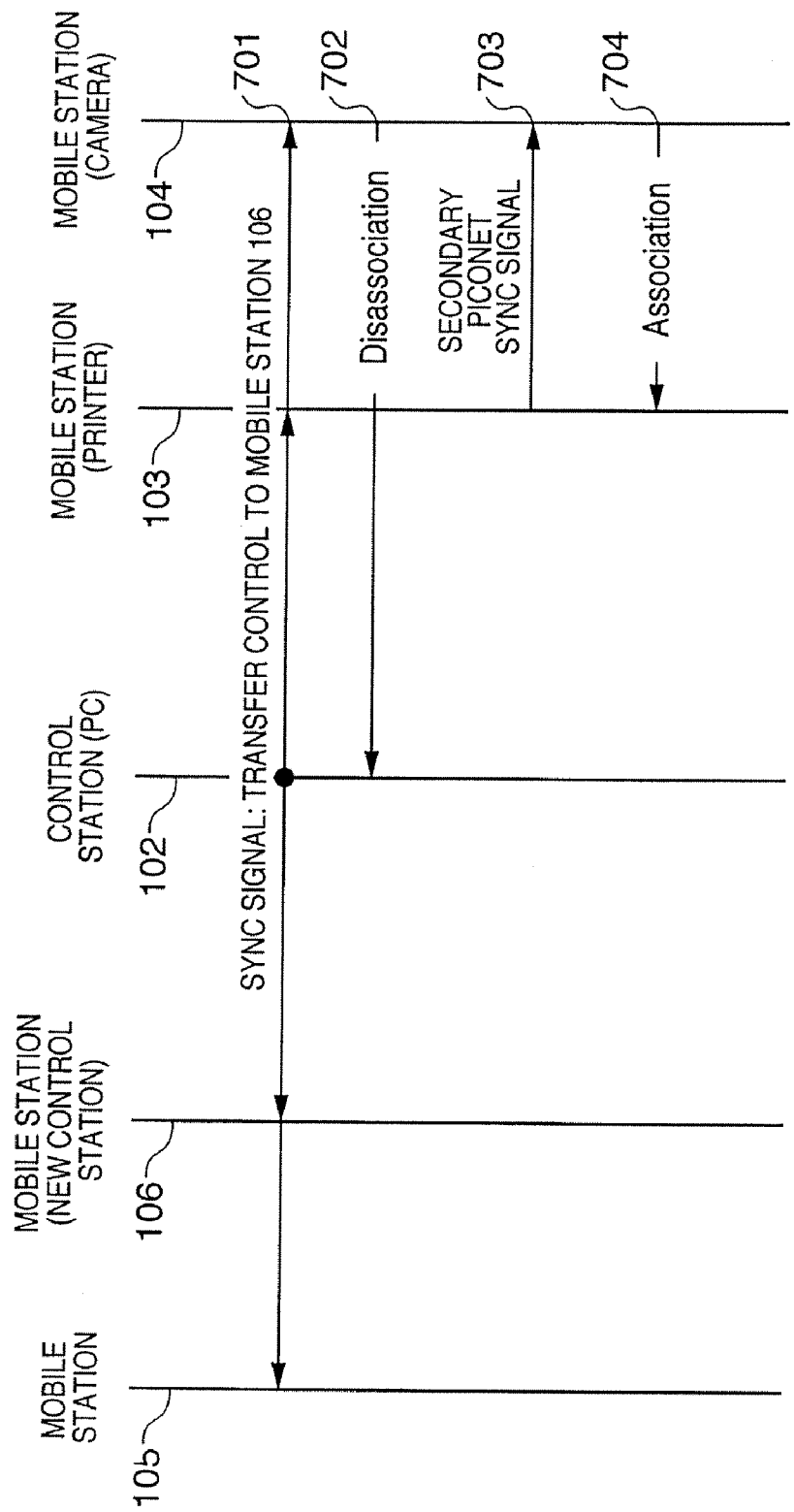
FIG. 7 is a sequence diagram of the first embodiment of the present invention.

The first embodiment of the present invention will be explained below with reference to FIGS. 1, 2, 3, 4, 6, and 7. FIG. 1 is a view showing the arrangement of the first embodiment of the present invention. FIG. 2 is a view showing the arrangement of the first embodiment after the control of a control station is transferred. FIG. 3 is a block diagram of a terminal. FIG. 6 is a flowchart of the operation of the terminal. FIG. 7 is a sequence diagram between terminals. In these drawings, unique reference numerals denote individual constituent elements.

FIG. 3 is a view showing the arrangements of communication apparatuses (i.e., terminals) according to the first embodiment of the present invention. Referring to FIG. 3, constituent elements corresponding to the type of each terminal are omitted. For example, a printer has a printer engine and engine controller for implementing a printer function. However, these elements are omitted, and only constituent elements for implementing a function as a communication terminal are shown. Also, FIG. 3 shows only two terminals. A communication terminal 1 has a UWB (Ultra Wide Band) interface 304 as a communicating means. This embodiment will explain UWB currently being standardized by IEEE802.15.3a. However, the present invention is also applicable to other communication interfaces such as the IEEE802.15.1 (Bluetooth (registered trademark)) standards and the IEEE802.15.4 standards. A CPU 301 controls the operation of the whole apparatus. A ROM 302 stores, e.g., control programs shown in FIGS. 5 and 6 executed by the CPU 301. A RAM 303 stores status tables storing the communication statuses of the individual terminals and reference tables. The RAM 303 also stores other control data. The UWB interface 304 performs communication by generating an electromagnetic field capable of communication at only short distances. A bus 306 connects these constituent elements. A communication terminal 2 has the same arrangement as the communication apparatus 1, so an explanation thereof will be omitted.

FIG. 1 is a view showing the arrangement of a network of this embodiment. Referring to FIG. 1, terminals 102 to 105 belong to a piconet 101. The terminal 102 is a personal computer (to be referred to as a control station 102 hereinafter) as a control station. The terminal 103 is a printer (to be referred to as a mobile station 103 hereinafter) as mobile station 1. The terminal 104 is a still camera (to be referred to as a mobile station 104 hereinafter) as mobile station 2. The terminal 105 is a video camera (to be referred to as a mobile station 205 hereinafter) as mobile station 3. The control station 102 outputs a sync signal 107 to construct and maintain the piconet 101.

The control station 102 and mobile stations 103 to 105 associate with each other to form a communication group (i.e., the piconet). Referring to FIG. 1, a television monitor 106 (to be referred to as a mobile station 106 hereinafter) as mobile station 4 becomes a new member of the piconet 101 by performing an association procedure. In addition, the control station 102 transfers the function of a control station to the mobile station 106, so the mobile station 106 becomes an alternative control station. In this example, however, the mobile station 104 cannot receive a sync signal transmitted from the alternative control station 106, and hence cannot participate in a piconet 201 (FIG. 2) managed by the alternative control station 106. When this is the case in the communication network according to this embodiment, a terminal which is a multi-functional station functioning as a mobile station belonging to the piconet 201 and which includes the mobile station 104 in a region within the communication range when functioning as a control station functions as a control station of a piconet to which the mobile station 104 belongs. That is, this embodiment selects a terminal which belongs to a plurality of networks at the same time, and allows this terminal to function as a multi-functional station, thereby reconnecting the mobile station 104 temporarily in a standalone state to the network.

FIG. 2 shows the piconet 201 in which the control is transferred from the original control station 102 to the mobile station 106, and a piconet 203 constructed by the multi-functional station 103 and including the mobile station 104. The alternative control station 206 outputs a sync signal 202 in order to construct and maintain the piconet 201. The piconet 203 is a secondary piconet constructed by the mobile station 103 which also functions as a control station. The mobile station 103 which also functions as a control station is called a multi-functional station 103. The multi-functional station 103 outputs a sync signal 204 in order to construct and maintain the piconet 203.

Referring to FIG. 1, each mobile station receives the sync signal 107 output from the control station 102, and performs an association procedure to the control station 102. This allows communication between the control station 102 and each mobile station and between the individual mobile stations, on the basis of the sync signal 107 output from the control station 102. Note that the mobile stations directly communicate with each other without the control station.

<Management of Terminal Statuses>

The communication statuses of the mobile stations which belong to the piconet 101 are saved as communication recording tables. FIG. 12A shows a communication recording table 1301 of the mobile station 103. FIG. 12B shows a communication recording table 1302 recording the communication statuses of the mobile station 104. Each communication recording table is stored in a memory or the like of a corresponding station. If possible, these communication recording tables are transferred to an alternative control station when the control of a control station is transferred. The communication recording table 1301 contains a communication partner ID 1301a, a communication time 1301b for each communication partner, a communication count 1301c, a data amount 1301d, and a time zone allocation order 1031e. Note that the time zone allocation order 1301e may also be managed independently of the communication recording table 1301. Referring to the communication recording table 1301 reveals the following. Note that the ID of each communication partner is indicated by the reference numeral shown in FIG. 1. The largest communication count of the mobile station 103 is 5 which is the number of times of communication with the original control station 102. The longest communication time of the mobile station 103 is 20 which is the time of communication with the control station 102. Also, the largest data amount of the mobile station 103 is 150 which is a data amount communicated with the mobile station 104. The communication time zone allocation order 1301e is the order of time slots allocated to the individual stations by the control station. The mobile station 103 is allocated next to the control station 102 and before the mobile station 104. A time-division scheme is used to perform communication between the control station 102 and each mobile station and between the individual mobile stations in the piconet 101. A communication time to each communication partner is exclusively allocated to the control station 102 and each mobile station. Each station requests the control station 102 of the piconet 101 to allocate a communication time, so the control station 102 manages the allocation. Accordingly, a station which requires no communication does not request any communication time zone, so no time zone is allocated to this station. The communication recording table 1301 shows that all the terminals have requested a communication time zone.

The communication recording table 1302 shows the communication record of the mobile station 104. The meanings of individual items are the same as the table 1301. Referring to the communication recording table 1302 reveals the following. The mobile station 104 has the largest connection count, the largest communication data, and the longest communication time with respect to the mobile station 103. A communication time zone is of course set for the mobile station 104.

The communication recording table 1301 shows the relations between the mobile station 103 and the control station and other mobile stations, and the relations between these stations are determined on the basis of this table. The communication recording table 1302 shows the relations between the mobile station 104 and the control station and other mobile stations, and the relations between these stations are determined on the basis of this table.

FIGS. 13A and 13B show examples of status tables recording the statuses of the mobile stations 103 and 104, respectively. In this embodiment, a status table indicating the statuses of each station is saved in a memory or the like of the station. The status tables are exchanged by communication in the piconet to synchronize the contents of the tables. It is of course also possible to allow a control station to collectively manage the status tables and transmit a status table to a station requiring the table. A status table 1401 shown in FIG. 13A shows the statuses of the mobile station 103. Since the mobile station 103 is a printer, the status table 1401 contains the statuses as a printer. When the mobile station 103 functions as a control station, each mobile station determines on the basis of the status table 1401 whether to associate with the control station 103. The status table 1402 shows the statuses of the mobile station 104. A control station which intends to construct a piconet including the mobile station 104 determines whether to output a sync signal by referring to the status table 1402.

The status table 1401 shows, for example, the residual quantities of expendables such as paper and ink. In this embodiment, the status table 1401 shows a residual paper quantity 1401a, residual ink quantity 1401b, and the like. Although FIG. 13A shows only the presence/absence of each residual quantity, it is of course also possible to indicate each residual quantity by a numerical value. Also, a residual battery quantity 1401c of a battery-driven product can be used as a criterion without any problem.

The status table 1402 shows, for example, the battery status and the presence/absence of data to be transmitted. Although the battery status and the presence/absence of data to be transmitted are used as criteria in this case as well, the residual quantity of the memory or the like can also be used without any problem.

These tables shown in FIGS. 12A, 12B, 13A, and 13B are formed by storing the statuses of the individual stations while they are communicating or operating. The control station uses these tables as criteria whether to perform an association procedure with a mobile station in a region outside the communication range, and whether to output a sync signal to the mobile station.

<Control Station Transfer Procedure>

As described above, the control station 102 and individual mobile stations repetitively communicate with each other in the piconet 101, and each store the communication time, communication count, communication amount, and the like with respect to each station. Each station also stores the allocation of the communication time zones to the other stations. In addition, each station always updates the operation statuses as shown in FIG. 13A or 13B.

FIG. 7 is a message sequence diagram for control station transfer. Referring to FIGS. 1 and 7, in the piconet 101 managed by the present control station 102, the mobile station 106 becomes a member (mobile station) of the piconet 101 in accordance with the association procedure. The mobile station 106 is superior in function (capability) as a control station than the present control station 102. The recently standardized IEEE802.15 MAC defines that if a mobile station having high capability as a control station becomes a member by association, the control of a control station must be transferred. According to this standard, the control of a control station must be transferred to the mobile station 106.

The control station 102, therefore, transfers the function of a control station to the newly associated mobile station 106. First, the control station 102 transmits a sync signal containing information (a message 701 shown in FIG. 7) indicating the transfer of the control to the mobile station 106, the mobile station ID of the transfer destination, and the like. After transmitting the message 701, the control station 102 starts transferring the function of a control station to the mobile station 106 by the procedure complying with the above-mentioned standard. For example, after transmitting the message 701, the control station 102 waits for a sync signal for a predetermined time as a mobile station. Other stations also wait for a sync signal for a predetermined time.

The alternative control station 106 broadcasts a sync signal within the time during which the mobile stations are waiting, and constructs a piconet including mobile stations having responded to the sync signal.

Each mobile station monitors a message indicating that the association procedure is to be performed, e.g., an association request transmitted by another mobile station. When monitoring an association request from another mobile station, a mobile station stores the information. That is, if a mobile station monitors an association request transmitted from another mobile station in the same piconet, the mobile station records the ID of the other mobile station on a monitored ID list.

FIG. 6 shows a procedure which a mobile station as described above executes when receiving, from the control station, the sync signal 701 notifying the transfer of the control station. A mobile station having received the sync signal 701 determines whether the ID of a mobile station as the control transfer destination contained in the sync signal 701 is contained in the monitored ID list of mobile stations from which association requests are monitored (S601). If the monitored ID list contains the ID, the mobile station determines that it exists within the communication range of the alternative control station. If the monitored ID list does not contain the ID, the mobile station determines that it exists outside the communication range of the alternative control station.

In the former case, the mobile station exists within the communication range and hence waits for a sync signal from the alternative control station. When receiving the sync signal, the mobile station transmits an association request to the control station and connects to it (S602). At the same time, after receiving the sync signal 701 notifying the transfer of the control station, the mobile station monitors a disassociation request transmitted from another mobile station (which belongs to the same piconet) (S603). If a disassociation request is monitored, the mobile station can determine that a mobile station as the transmission source of the disassociation request exists outside the communication range of the alternative control station. If a disassociation request is monitored, therefore, the mobile station having monitored the disassociation request determines whether the relation to a mobile station as the transmission source of the disassociation request is high (S604). The mobile station determines the relation by referring to the communication recording table saved in it. This determination is done by referring to, e.g., the connection count, communication time, communication data amount, and the presence/absence of time zone allocation with respect to the disassociation transmission source mobile station. The mobile station compares, e.g., the connection count, communication time, and communication data amount with respective predetermined reference values, and determines that the relation is high if one or all of these values are equal to or larger than the reference values. It is also possible to compare values concerning individual mobile stations, and determine that the relation to a mobile station having largest values is high. Alternatively, it is possible to determine that the relation is high if a communication time zone is also set. These criteria may also be combined. Thus, the relation can be determined by various criteria.

If the relation is found to be high, the mobile station determines whether it is necessary to connect to the disassociation transmission source mobile station (S605). The mobile station determines that the connection is necessary if the connection makes it possible to use services provided by the other mobile station, or the connection allows the other mobile station to use services of the piconet. In other words, the necessity for connection is the meaning of connection. This determination is done by referring to the status table. For example, if the status table concerning the disassociation transmission source mobile station records that it has data to be transmitted, the mobile station can determine that the connection is necessary. Also, the connection is necessary if the mobile station which performs determination in step S605 is a printer and the status table of this printer shows that the expendables still remain.

If YES in all of steps S603 to S605, the mobile station broadcasts a sync signal to construct a piconet including the disassociation request transmission source mobile station. This is of course based on the assumption that the mobile station has the function as a control station. First, however, the mobile station determines whether to construct a new piconet as a secondary piconet of the original piconet or as an independent piconet (S606-1). A criterion is, e.g., the communication recording table of the mobile station. If the table contains the communication record of a terminal existing in the original piconet, the mobile station determines that the new piconet should be a secondary (dependent) piconet. In this case, the mobile station broadcasts a sync signal in step S606-3. If the new piconet can be an independent piconet, the mobile station transmits a disassociation request to the alternative control station 106 of the original piconet, thereby disconnecting from it (S606-2). After that, the process advances to step S606-3. A stay of the mobile station 103 in the original piconet 201 largely increases the power consumption and limits the communication band. An independent piconet eliminates these disadvantages.

If there is a mobile station which transmits an association request in response to the sync signal, a piconet including this mobile station is constructed. On the other hand, if NO in any of steps S603 to S605, even a disassociation request transmission source mobile station is let alone. That is, the mobile station does not particularly do anything; it performs communication within the piconet to which it belongs, and operates as a terminal.

On the other hand, if the mobile station determines in step S601 that the monitored ID list does not contain the ID of the alternative control station, the mobile station transmits a disassociation request to the control station (S608). That is, this mobile station itself becomes the mobile station which transmits the disassociation request monitored in step S603. The mobile station then determines whether it can operate as a control station (S609). If the mobile station cannot operate as a control station, the mobile station waits for the reception of a sync signal because it must operate as a mobile station or in a standalone state (S612).

If the mobile station can operate as a control station, the mobile station determines whether it is necessary to connect to the piconet (S610). The mobile station determines the necessity by looking up, in the communication recording table or status table, the record of communication with a mobile station or control station in the original piconet. For example, if the status table indicates that the residual battery quantity is sufficient and there is data to be transmitted, the mobile station determines that the connection is necessary. The criterion is of course not limited to this one.

If the mobile station determines in step S610 that the connection is necessary, the mobile station broadcasts a sync signal (S611). The mobile station constructs a piconet in accordance with an association request which is a response to the sync signal. If the connection is unnecessary, the mobile station can terminate the process without performing anything. In this embodiment, however, the mobile station waits for a sync signal (S612).

The above procedure allows the mobile station to specify another mobile station which goes outside the communication range of a new control station. The mobile station can secure communication with the specified mobile station by constructing a piconet including the specified mobile station. Note that in FIG. 6, a mobile station which goes outside the communication range of a new control station becomes a control station if the mobile station can function as a control station. However, it is also possible to unconditionally execute step S612 after step S608. In addition, when broadcasting a sync signal in step S606, it is also possible to determine whether the mobile station as the transmission source of the disassociation request can operate as a control station, and execute step S606 if the mobile station cannot operate as a control station. Whether another mobile station is operable as a control station can be determined by exchanging capability information with other mobile stations when communicating with them across the piconet 101, and saving the capability information.

Furthermore, in step S606-1 of this embodiment, the mobile station determines whether to stay in the piconet formed by the new control station or to be independent of the piconet. However, this piconet can always be a secondary piconet.

The operation of the overall network will be explained again below with reference to the arrangement shown in FIG. 1 by taking the above operation into account. Assume, for example, that the mobile station 104 was unable to monitor the association request when the mobile station 106 associated with the piconet 101. In this case, the monitored ID list of the mobile station 104 does not contain the mobile station 106. Accordingly, when receiving, from the control station 102, a sync signal indicating that the mobile station 106 becomes an alternative control station, the mobile station 104 determines that it goes outside the communication range of the alternative control station 106. The mobile station 104 having determined that it goes outside the communication range transmits a disassociation request to the original control station 102 and performs a disassociation procedure, thereby disassociating from the piconet 101 (a message 702 in FIG. 7). This determines that the mobile station 104 is not a member of the piconet 201 controlled by the new control station 106.

The mobile station 103 having monitored the disassociation message from the mobile station 104 checks the relation to the mobile station 104 outside the communication range. This relation is checked using the criteria shown in Table 1. The connection count and communication time are the second largest next to those of the control station 102, but the communication data amount is the largest in the piconet 101. Also, a communication time zone is naturally set. Therefore, the mobile station 103 determines that the relation is high. If the disassociated station is the mobile station 105, the mobile station 103 checks the connection count, communication data amount, and communication time in the communication recording table. The mobile station 103 determines that there is no relation if, for example, all these values are 0. In this case, the mobile station 103 ignores the disassociated mobile station and keeps operating in the new piconet 201.

If the mobile station 103 determines that there is a relation, the mobile station 103 determines whether it is meaningful to keep operating with the mobile station 104. This determination is done by using the status table. This is so because associating with the mobile station 104 is meaningless if the mobile station 103 is out of paper or ink. If the status table indicates that both paper and ink are "present", the mobile station 103 determines that it can continue operating with the mobile station 104. If the mobile station 103 is out of paper of ink, the mobile station 103 ignores the disassociated mobile station and keeps operating.

Then, the mobile station 103 determines whether the mobile station 104 outside the communication range can operate as a control station. If the mobile station 104 is operable as a control station, the mobile station 104 outputs a sync signal. Another mobile station which intends to communicate with the mobile station 104 need only start communicating with the mobile station 104 by associating with it when a communication traffic occurs. In this case, however, the mobile station 104 cannot operate as a control station. Whether a mobile station is operable as a control station can be determined by exchanging the capabilities between mobile stations while they are communicating with each other across the piconet 101. Also, a mobile station discloses its capability when associating with a control station. Therefore, whether the mobile station has capability as a control station can be determined by monitoring the association procedure.

Since the mobile station 104 cannot operate as a control station, the mobile station 103 having a relation forms a piconet in order to maintain communication with the mobile station 104. The mobile station 103 then determines whether to stay in or disassociate from the piconet formed by the new control station 106. This determination is done by using the communication recording table. If the communication recording table indicates that the possibility of communication with the station having formed the piconet 101, e.g., the control station 102, is high, the mobile station 103 maintains the connection. In this embodiment, the connection is maintained. This determination allows the mobile station 103 to operate as a control station while the mobile station 103 keeps belonging to the piconet 201. Therefore, the mobile station 103 outputs the sync signal 204 and forms a secondary piconet. The mobile station 104 is obviously able to receive the sync signal 204 from the mobile station 103 because they have communicated with each other while they are operating in the piconet 101.

The mobile station 104 having received the sync signal 204 from the mobile station 103 determines whether it is meaningful to associate with the mobile station 103. This determination can be performed by using the status table 1402 of the mobile station 103. The determination is performed because association is meaningless if the mobile station 104 has no large residual battery quantity or has no data to be transmitted. Since both the battery and data are "present" in this case, the mobile station 104 associates with the mobile station 103. If the criterion in the status table 1402 is "absent", it is only necessary to ignore the sync signal from the mobile station 103. This allows the mobile station 104 to communicate with the mobile station 103. After the control of a control station is transferred, the new control station 106 outputs the sync signal 202.

Figure 4:
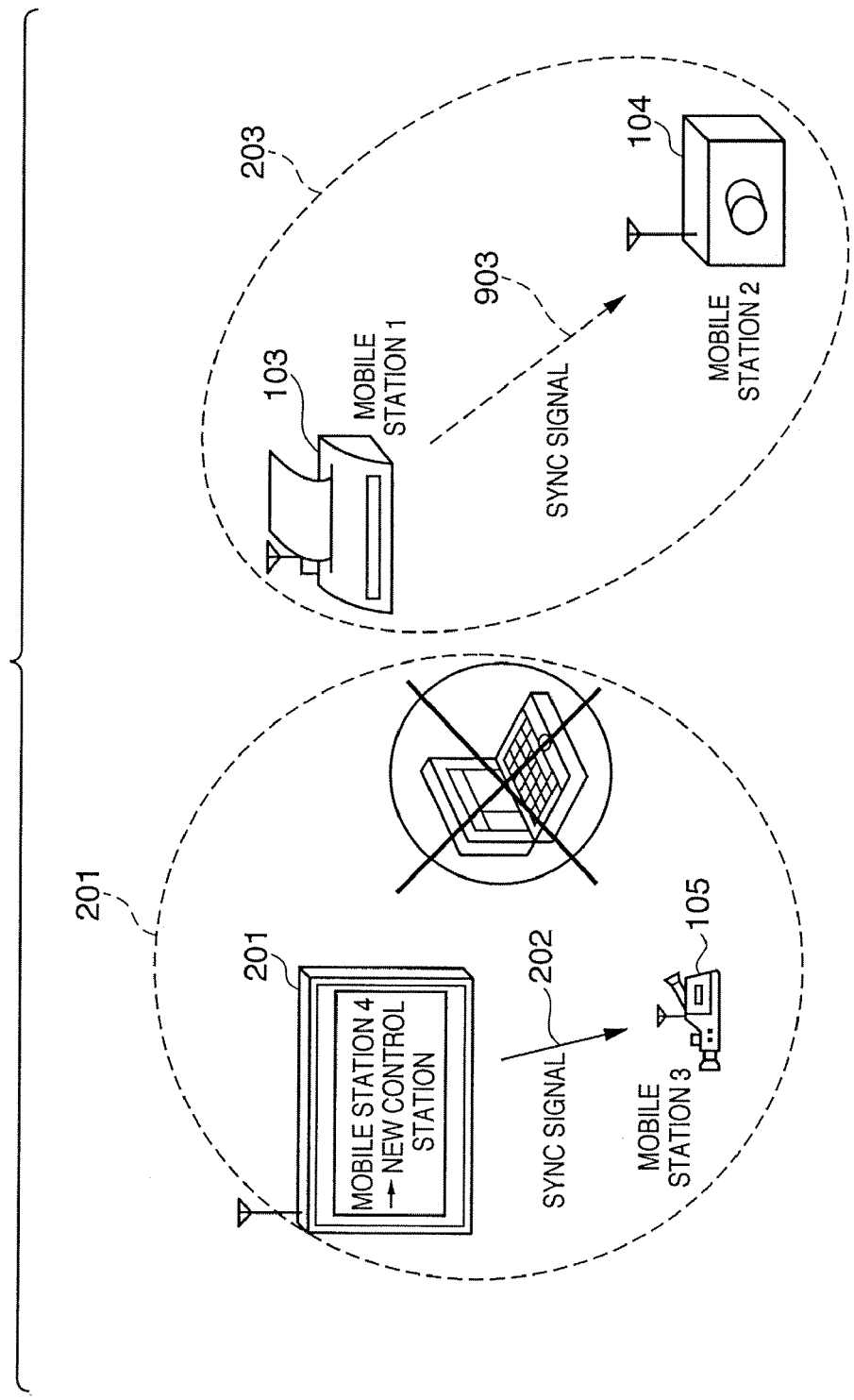
FIG. 4 is a view showing the arrangement of the first embodiment of the present invention after the control of a control station is transferred.
Figure 9:
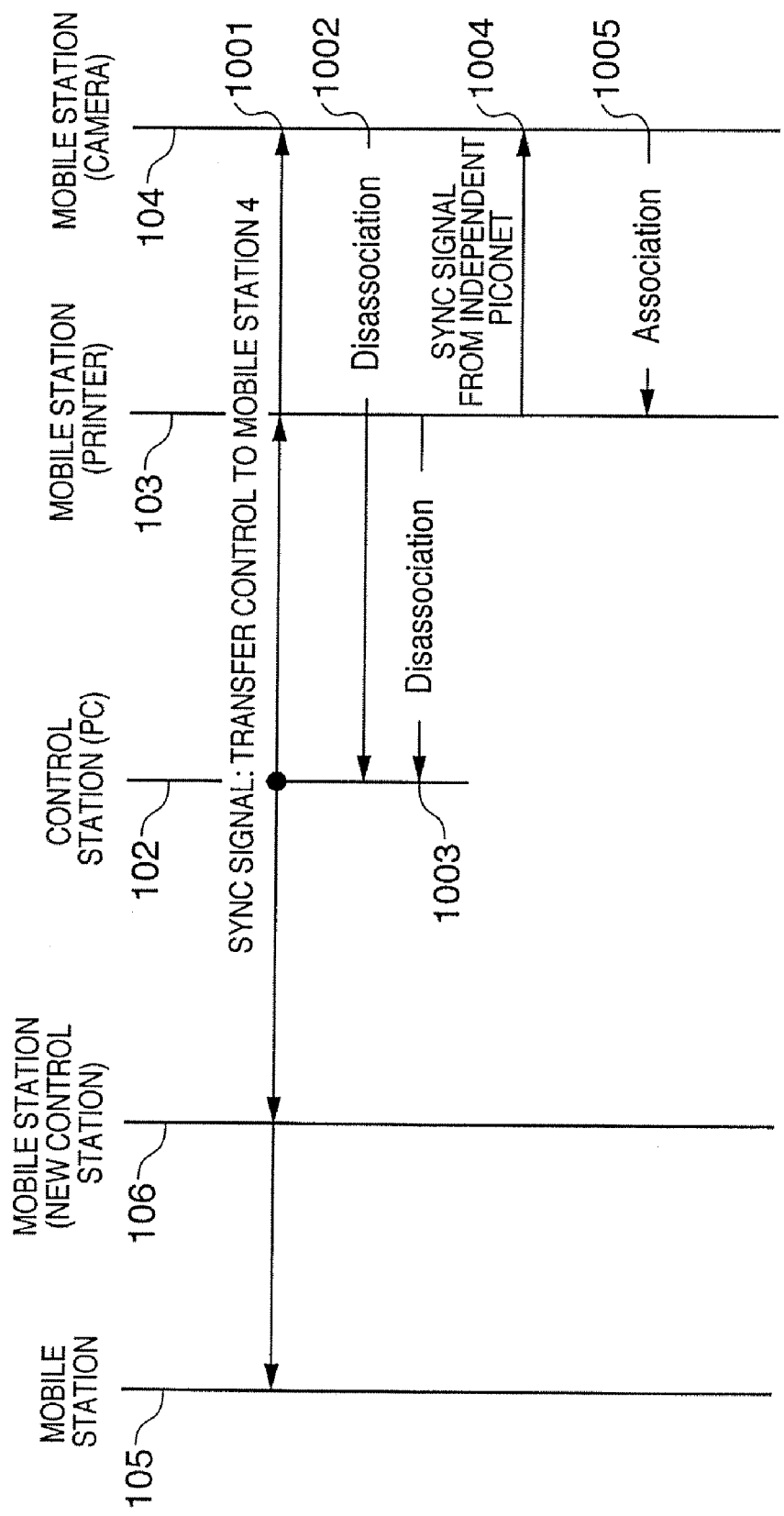
FIG. 9 is a sequence diagram of the first embodiment of the present invention.

The above procedure makes it possible to construct a new piconet including a mobile station in a region outside the communication range of a new control station, and provide network resources to the mobile station, or use network resources provided by the mobile station. Note that FIG. 4 shows a state in which the mobile station 103 is disassociated from the original piconet 201 to isolate the piconet 203. FIG. 9 shows a message sequence including a procedure by which the mobile station 103 transmits a disassociation request 1003 to the control station 106 in step S606-2.

Second Embodiment

The second embodiment of the present invention will be explained below by partially changing the first embodiment described above by replacing FIG. 7 in the first embodiment with FIG. 8. In this embodiment, if mobile stations belonging to the original piconet include a mobile station which transmits no association request to an alternative control station or a mobile station which does not respond to a sync signal, the alternative control station notifies another mobile station that the mobile station has disassociated. The other mobile station having received the notification constructs a secondary piconet including the disassociated mobile station.

Figure 8:
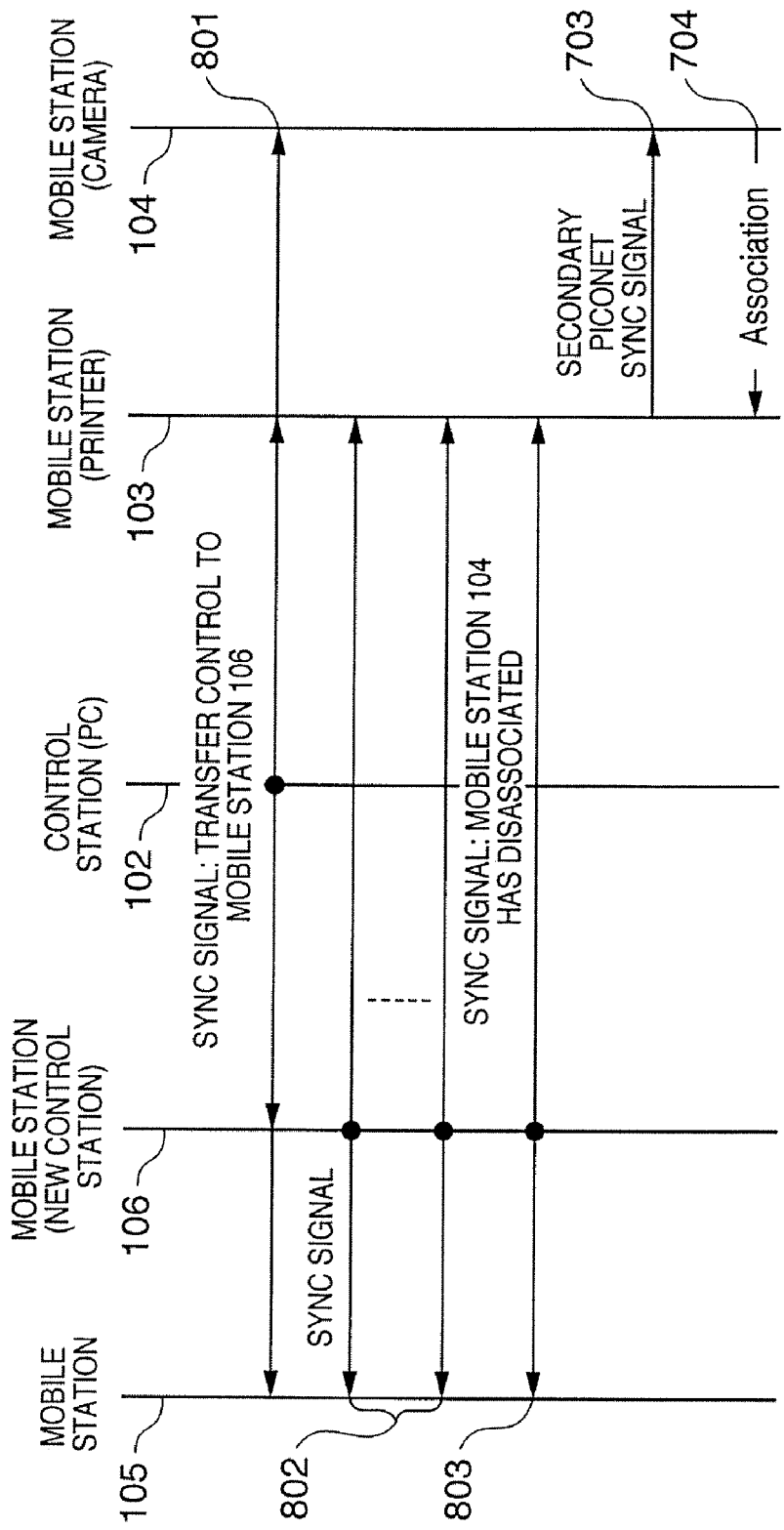
FIG. 8 is a sequence diagram of the second embodiment of the present invention.

Referring to FIG. 8, a mobile station 104 having received a sync signal containing a procedure of transferring the control from a control station 102 to a mobile station 106 has no monitoring function. A monitoring operation requires a receiving circuit to operate in a time zone other than a communication time of the device. Therefore, a device like a mobile device which operates by a battery performs no monitoring operation in order to save the battery.

The mobile station 104 which performs no monitoring operation receives a sync signal 801 indicating the transfer of the function of a control station to the mobile station 106. After the function is transferred to the new control station 106, a state in which the mobile station 104 cannot receive a sync signal 202 from the new control station 106 continues for a predetermined period (802). If a response signal from a mobile station forming the piconet cannot be received for a certain predetermined period, the new control station 106 determines that the mobile station has gone outside the range of a piconet 201 managed by the control station 106 which outputs the sync signal.

The control station 106 transmits, to a mobile station in the piconet 201, a sync signal 803 containing information indicating that the mobile station 104 which has not responded within the predetermined period is disassociated. A mobile station 103 having received the sync signal 803 from the control station 106 detects that the mobile station 104 has disassociated from the piconet 201. The mobile station 103 proceeds to an operation of checking the relation to the mobile station 104 having disassociated from the piconet, and secures communication by associating with the mobile station 104. The rest of the operation is the same as the first embodiment, so an explanation thereof will be omitted.

Figure 5:
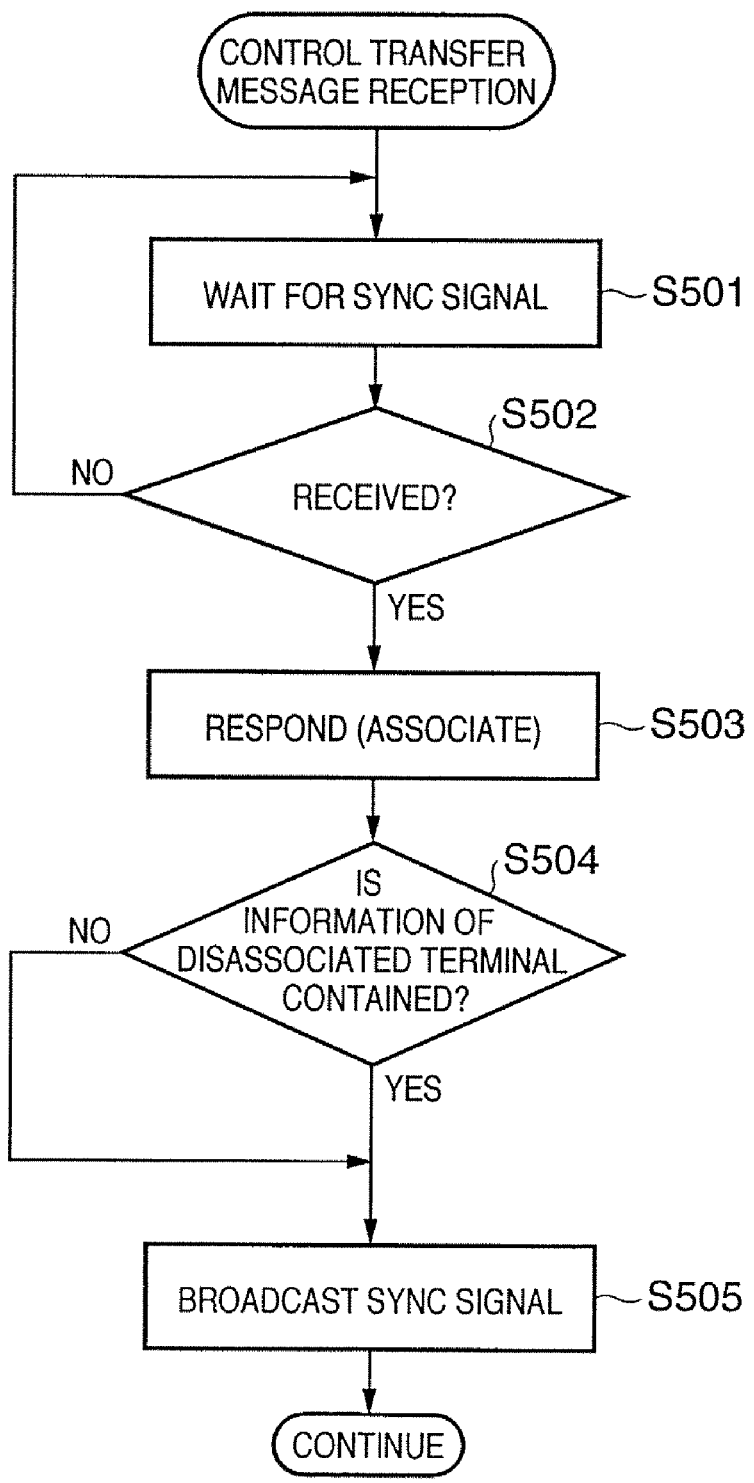
FIG. 5 is a flowchart of the second embodiment of the present invention.

As described above, this embodiment differs from the first embodiment in the method by which a certain mobile station belonging to a piconet before the control of a control station is transferred detects that another mobile station belonging to the same piconet has disassociated from the piconet after the transfer. FIG. 5 shows the procedure of a mobile station. A mobile station having received a sync signal containing information indicating the transfer of the control of a control station waits for the next sync signal (S501). When receiving the sync signal (YES in S502), the mobile station responds to the sync signal (S503). If the mobile station is waiting for connection, it transmits an association request. Then, the mobile station determines whether the received sync signal contains information concerning a disassociated mobile station among mobile stations in the piconet (S504). The control station transmits this sync signal as a signal containing the ID and the like of a mobile station which has not responded to the sync signal within a reference time. If the information is contained, the mobile station broadcasts a sync signal in order to construct a secondary piconet including the disassociated mobile station (S505). In step S505, it is also possible to allow each mobile station to refer to the communication recording table explained in the first embodiment, and allow only a mobile station having communicated with the disassociated mobile station to broadcast the sync signal. Alternatively, it is possible to allow each mobile station to refer to the status table, and allow a mobile station which has data to be exchanged with the disassociated mobile station, which can use the resources of the disassociated mobile station, or which has resources to be used by the disassociated mobile station, to broadcast the sync signal.

This arrangement obviates the need for a mobile station to monitor communication of another station, and makes it possible to reduce the power consumption and processing load.

Third Embodiment

Figure 10:
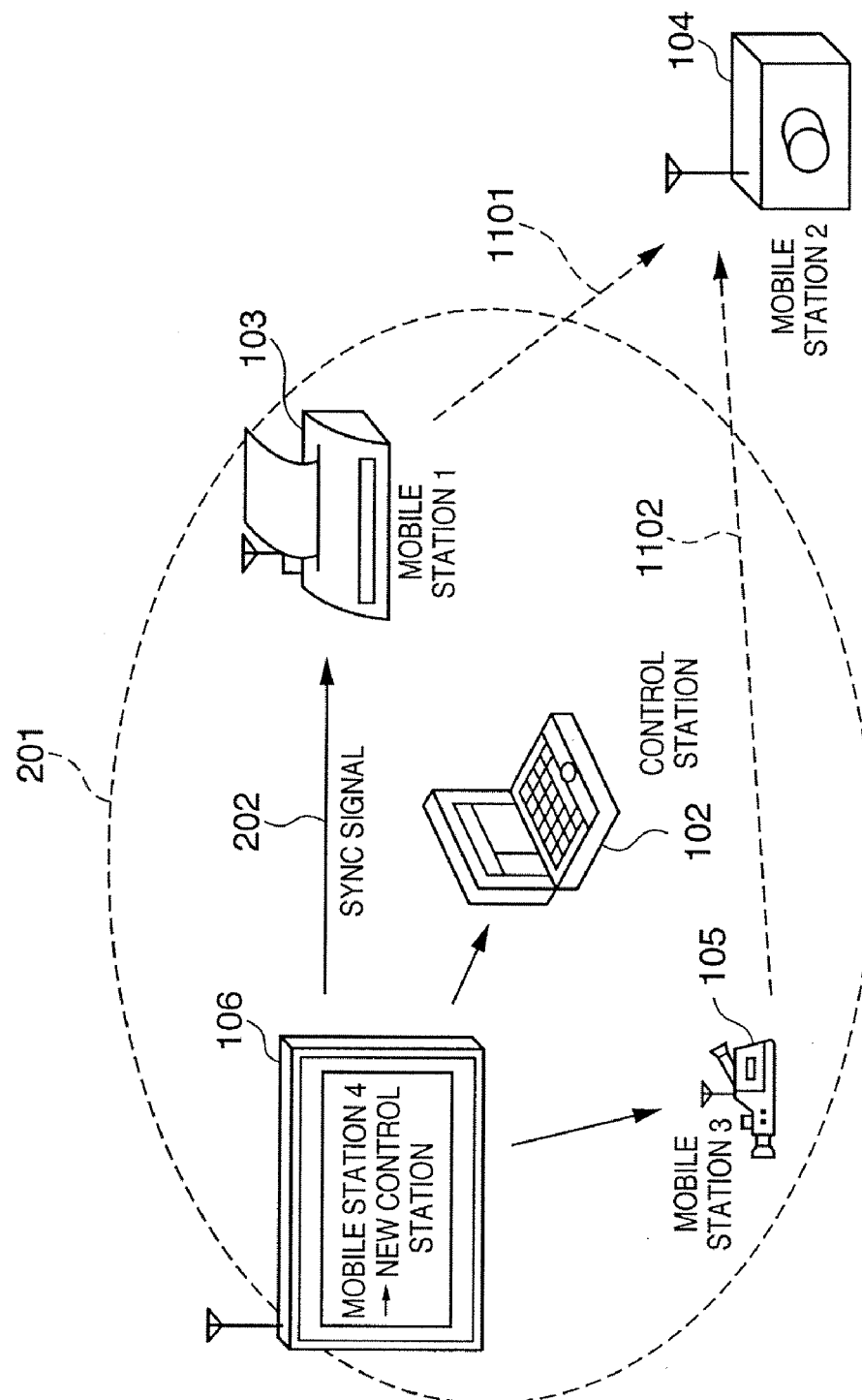
FIG. 10 is a view showing the arrangement of the third embodiment of the present invention.
Figure 11:
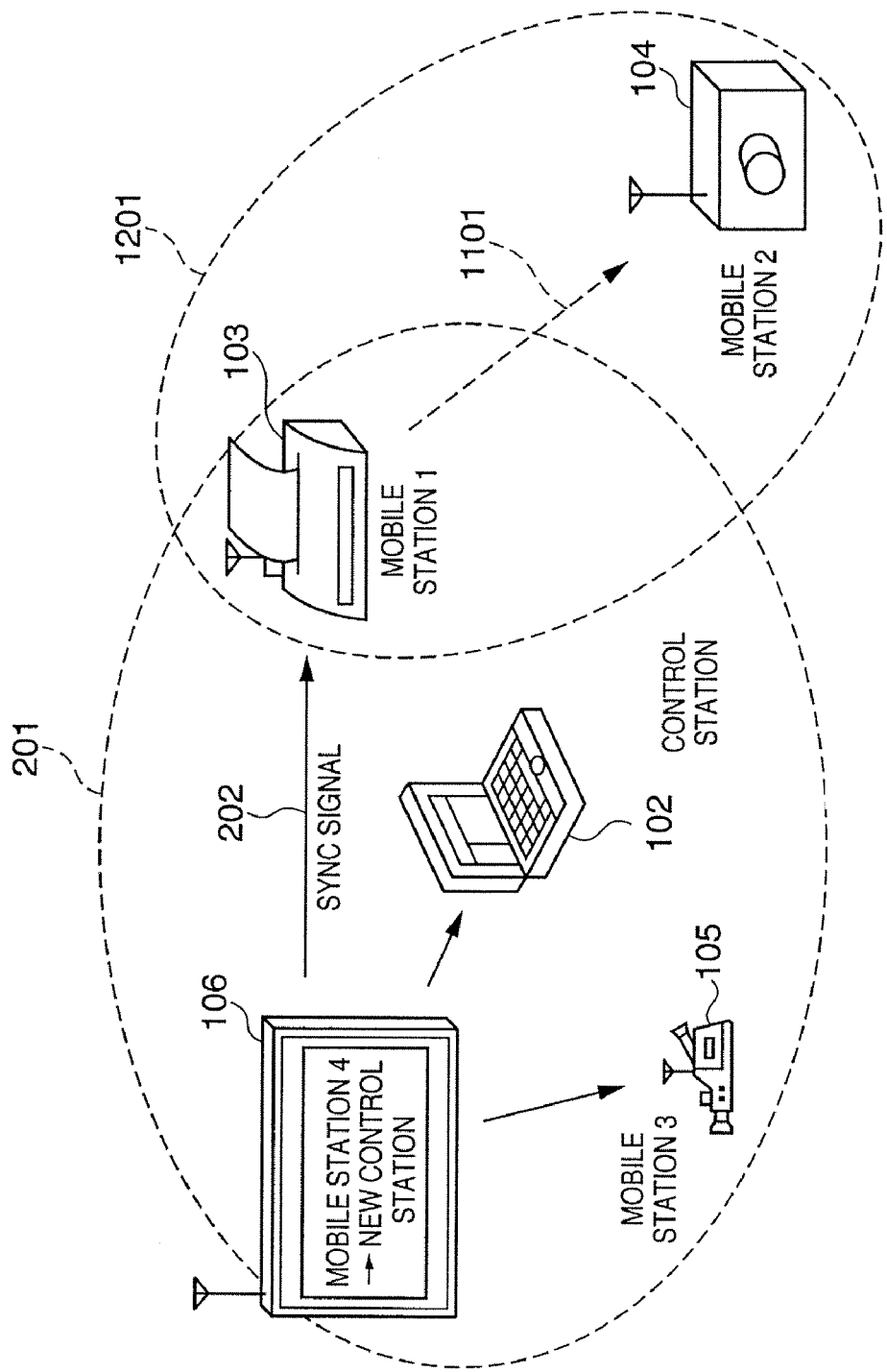
FIG. 11 is a view showing the arrangement of the third embodiment of the present invention.

The third embodiment of the present invention will be explained below with reference to FIGS. 10 and 11. Referring to FIGS. 10 and 11, a mobile station 103 outputs a sync signal 1101. A mobile station 105 outputs a sync signal 1102. A piconet 1201 is a piconet when the mobile station 103 is a control station. A mobile station 104 has information indicating a control station of a communication group in which the mobile station 104 participates if it goes outside the communication range while operating in a piconet 101. That is, the mobile station 104 stores the set communication group. In this embodiment, the mobile station 104 stores preset information indicating that it participates in the communication group controlled by the mobile station 103. Assume that the mobile station 104 goes outside the communication range of a piconet 201 because the function of a control station is transferred from a control station 102 to a mobile station 106. The mobile stations 103 and 105 having determined that the mobile station 104 has gone outside the communication range output sync signals to form a communication group with the mobile station 104. Note that it is possible to determine that the mobile station 104 has gone outside the communication range by monitoring a disassociation request as in the second embodiment, or on the basis of a notification from the control station as in the first embodiment. The mobile station 103 outputs the sync signal 1101, and the mobile station 105 outputs the sync signal 1102. Since the mobile station 104 is preset to participate in the communication group of the mobile station 103, the mobile station 104 having received the two sync signals ignores the sync signal 1102, receives the sync signal 1101, and associates with the mobile station 103 as a control station. That is, the mobile station 104 preferentially responds to the preset control station. As a consequence, it is possible to form the communication group 1201 and ensure communication. Note that this embodiment can be combined with the first or second embodiment.

In this embodiment as described above, even when a plurality of mobile stations are going to construct secondary piconets, a piconet can be constructed between predetermined stations. However, this embodiment is also applicable to a case in which sync signals conflict with each other. For example, when there is only one multi-functional station which outputs a sync signal, a mobile station responds to the sync signal regardless of the stored communication group. This improves the reliability of the construction of a piconet.

The present invention can be applied to a system constituted by a plurality of devices (e.g., a host computer, interface, reader, and printer) or to an apparatus (e.g., a copying machine or facsimile apparatus) comprising a single device. It is also possible to achieve the object of the present invention by supplying a recording medium recording a program code for implementing the functions of the above embodiments to a system or apparatus, and reading out and executing the program code stored in the storage medium by a computer of the system or apparatus. In this case, the program code read out from the storage medium implements the functions of the above embodiments, and the program code and the storage medium storing the program code constitute the present invention.

Furthermore, the present invention includes a case where an operating system (OS) or the like running on the computer performs part or the whole of actual processing on the basis of designations by the program code, thereby implementing the functions of the above embodiments. The present invention is also applied to a case where the program code read out from the storage medium is written in a memory of a function expansion card inserted into the computer or of a function expansion unit connected to the computer. In this case, a CPU or the like of the function expansion card or function expansion unit performs part or the whole of actual processing on the basis of designations by the written program code, thereby implementing the functions of the above embodiments.

More specifically, a message receiver of each of the communication apparatuses 103 to 106 which function as mobile stations receives, from the original control station, a message containing control transfer information recording a control transfer destination control station to which the control of a control station is to be transferred. The UWB interface 304 or IEEE802.11b interface 305 implements this message receiver.

Also, when receiving the control transfer information, a communication range determination unit determines whether the mobile station is in a region within the communication range of the control transfer destination control station. The CPU 301 implements this communication range determination unit by executing step S601.

If the communication range determination unit determines that the mobile station is in a region within the communication range of the control transfer destination control station, an existence determination unit determines whether there is another mobile station which belongs to the communication group of the original control station and exists in a region outside the communication range of the control transfer destination control station. The CPU 301 implements this existence determination unit by executing step S603.

If the existence determination unit determines that the other mobile station exists, a sync signal output unit outputs, as a third control station, a management signal for constructing a communication group including the other mobile station. The CPU 301 implements this sync signal output unit by outputting the sync signal from the UWB interface 304 or IEEE802.11b interface 305 by executing step S603-3.

Alternatively, the message receiver of each of the communication apparatuses 103 to 106 which function as mobile stations receives, from the original control station, a message containing control transfer information recording a control transfer destination control station to which the control of a control station is to be transferred.

When receiving the control transfer information, the communication range determination unit determines whether the mobile station is in a region within the communication range of the control transfer destination control station.

If the communication range determination unit determines that the mobile station is in a region outside the communication range, a disassociating unit disassociates from the communication group of the original control station. The CPU 301 implements this disassociating unit by executing step S608.

If the mobile station disassociates from the communication group of the original control station by the disassociating unit, a waiting unit waits for a sync signal from a third control station, and responds to a received sync signal. The CPU 301 implements this waiting unit by executing step S612.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-005392, filed Jan. 12, 2006, which is hereby incorporated by reference herein in its entirety.

What is claimed is:

1. A communication apparatus, comprising:
   a management unit adapted to manage communication logs with other communication apparatuses and statuses related to a function of other communication apparatuses;
   a message receiver that receives a message indicating that a control apparatus changes from a first control apparatus to a second control apparatus that is a new control apparatus, while the communication apparatus belongs to a communication group of the first control apparatus;
   a communication range determination unit adapted to, if the message receiver receives the message, determine whether the communication apparatus is in a region within a communication range of the second control apparatus;
   an existence determination unit adapted to, if the communication range determination unit determines that the communication apparatus is in a region within the communication range of the second control apparatus, determine whether there is an outside communication apparatus that belonged to the communication group of the first control apparatus and exists in a region outside the communication range of the second control apparatus; and
   a management signal output unit adapted to, if the existence determination unit determines that the outside communication apparatus exists, output, as a third control apparatus, a management signal for constructing a communication group with the outside communication apparatus, according to communication logs with the outside communication apparatus and a status related to a function of the outside communication apparatus.

2. The communication apparatus according to claim 1, further comprising:
   a selection unit adapted to select any one of operating as a fourth control apparatus and operating as a slave apparatus under the third control apparatus; and
   an association unit adapted to associate with the third control apparatus as a slave apparatus, according to a selection by the selection unit.

3. The communication apparatus according to claim 2, further comprising: a storage unit adapted to store communication group information indicating that the communication apparatus participates in a communication group if the communication apparatus becomes unable to receive the management signal,
   wherein the association unit associates the communication group indicated by the communication group information if the communication apparatus becomes unable to receive the management signal.

4. The apparatus according to claim 1, wherein the communication range determination unit determines whether the communication apparatus is in a region within the communication range of the second control apparatus, based on the communication logs with the other communication apparatuses managed by the management unit.

5. The communication apparatus according to claim 1, wherein when receiving a disassociation request message for disassociating from the communication group of the first control apparatus, the existence determination unit determines that there is the outside communication apparatus.

6. The communication apparatus according to claim 1, wherein the management signal output unit outputs the management signal, as a third control station, in case that a value of the communication log with the outside communication apparatus is equal to or larger than a predetermined value and a connection to the outside communication apparatus is necessary.

7. The communication apparatus according to claim 1, wherein the communication logs with other communication apparatuses managed by the management unit comprise at least one of a communication time, a communication count, a communication data amount, and an allocated time zone, and wherein the statuses related to a function of other communication apparatuses comprise at least one of a residual battery quantity and a residual expendable quantity.

8. A communication method that is executed by a communication apparatus, the communication method comprising:
- a management step of managing communication logs with other communication apparatuses and statuses related to a function of other communication apparatuses;
- a message receiving step of receiving a message indicating that a control apparatus changes from a first control apparatus to a second control apparatus that is a new control apparatus, while the communication apparatus belongs to a communication group of the first control apparatus;
- a communication range determination step of, if the message is received in the message receiving step, determining whether the communication apparatus is in a region within a communication range of the second control apparatus;
- an existence determination step of, if it is determined in the communication range determination step that the communication apparatus is in a region within the communication range of the second control apparatus, determining whether there is an outside communication apparatus that belonged to the communication group of the first control apparatus and exists in a region outside the communication range of the second control apparatus; and
- a management signal output step of, if it is determined in the existence determination step that the outside communication apparatus exists, outputting, as a third control apparatus, a management signal for constructing a communication group with the outside communication apparatus, according to communication logs with the outside communication apparatus and a status related to a function of the outside communication apparatus.

9. A non-transitory computer-readable recording medium containing a program that causes a computer to execute a control method of a communication apparatus, the control method comprising:
- a management step of managing communication logs with other communication apparatuses and statuses related to a function of other communication apparatuses;
- a message receiving step of receiving a message indicating that a control apparatus changes from a first control apparatus to a second control apparatus that is a new control apparatus, while the communication apparatus belongs to a communication group of the first control apparatus;
- a communication range determination step of, if the message is received in the message receiving step, determining whether the communication apparatus is in a region within a communication range of the second control apparatus;
- an existence determination step of, if it is determined in the communication range determination step that the communication apparatus is in a region within the communication range of the second control apparatus, determining whether there is an outside communication apparatus that belonged to the communication group of the first control apparatus and exists in a region outside the communication range of the second control apparatus; and
- a management signal output step of, if it is determined in the existence determination step that the outside communication apparatus exists, outputting, as a third control apparatus, a management signal for constructing a communication group with the outside communication apparatus, according to communication logs with the outside communication apparatus and a status related to a function of the outside communication apparatus.

* * * * *